T. B. Emerson,
Wringer,
Nº 70,181.        Patented Oct. 29, 1867.
Fig. 1.
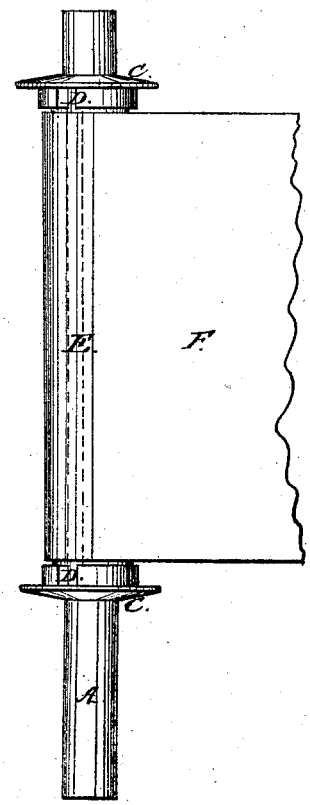
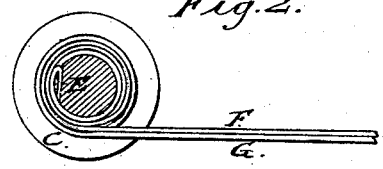
Fig. 2.
Witnesses;
J. W. Burridge
Frank S. Alden.
Inventor;
T. B. Emerson

United States Patent Office.

T. B. EMERSON, OF SEVILLE, OHIO.

Letters Patent No. 70,181, dated October 29, 1867.

---

IMPROVED CLOTHES-WRINGER.

---

The Schedule referred to in these Letters Patent and making part of the same.

---

TO ALL WHOM IT MAY CONCERN:

Be it known that I, T. B. EMERSON, of Seville, in the county of Medina, and State of Ohio, have invented certain new and useful Improvements in Clothes-Wringers; and I do hereby declare that the following is a full and complete description of the same, reference being had to the accompanying drawings, making a part of this specification, in which—

Figure 1 is a view of the roller.
Figure 2 is a transverse section.
Like letters of reference refer to like parts in the views.

Persons using clothes-wringers have become aware of the fact that the rubber on the rollers often gets loose on the shaft, in consequence of the constant strain and pressure exerted upon it while it is being used. Wringers with the rubber thus loosened are of no further practical use, hence they are either thrown aside for a new one, or a new set of rollers provided for the old frame. In either case it is a matter of no inconsiderable expense, as the wringers thus disabled are often good and complete in every other particular. In order to remedy this defect of the machine, and so constructing the rollers that they shall last until the wringer is wholly worn out, the following manner of attaching the rubber to the shaft is adopted, viz:

In fig. 1, A is the shaft on which are cast the collars C, so that the shaft and collars are one and entire. On one side of these collars is sunk a deep notch, D, in which is fitted a rod indicated by the dotted lines E. One side of the shaft is slightly cut away, so that the rod may lie flat and close upon it, and thereby add as little to the diameter of the shaft as possible. F is a piece of canvas, the width being equal to the length of the shaft between the collars, and long enough to wind a few times around it. One end of this canvas is folded over or hemmed down, and in which hem is inserted the rod E. The rod is then inserted in the notches D referred to, which, on being thus secured to the shaft, the end of a strip of rubber, G, of the same width of the cloth, is placed along the side of the rod. The two together are then wound tightly around the shaft, thus, the winding of the one enfolding that of the other, forming together an inner folding of canvas and rubber, as shown in fig. 2. The winding is still continued with the rubber until the required thickness of the roller is obtained, which is then properly secured, and vulcanized in the ordinary way. By this method of securing the rubber it will be evident that it cannot possibly get loose, but, on the contrary, the tendency of the rubber and canvas is to tighten on the shaft while the wringer is in use, care being taken to wind the rubber and cloth in the opposite direction from the revolving one given to the roller when in practical operation.

What I claim as my improvement, and desire to secure by Letters Patent, is—

The shaft A, collars C, provided with notches D, when said collars and shaft are constructed in one entire piece, in combination with the rod E, canvas F, and rubber G, in the manner as and for the purpose set forth.

T. B. EMERSON.

Witnesses:
ALMON BROWN,
JOSEPH SPINDLER